(12) United States Patent
Stuart et al.

(10) Patent No.: US 9,045,370 B2
(45) Date of Patent: Jun. 2, 2015

(54) AQUEOUS WAX EMULSIONS HAVING REDUCED SOLIDS CONTENT FOR USE IN GYPSUM COMPOSITIONS AND BUILDING PRODUCTS

(75) Inventors: Jonathan T. Stuart, Lansdale, PA (US); Christopher Lyons, Lichfield (GB); Don Indrajith Perera, Oak Park (AU)

(73) Assignee: Henry Company LLC, El Segundo, CA (US)

(*) Notice: Subject to any disclaimer, the term of this patent is extended or adjusted under 35 U.S.C. 154(b) by 354 days.

(21) Appl. No.: 13/278,064

(22) Filed: Oct. 20, 2011

(65) Prior Publication Data

US 2012/0216722 A1     Aug. 30, 2012

Related U.S. Application Data

(60) Provisional application No. 61/446,492, filed on Feb. 24, 2011.

(51) Int. Cl.

| | |
|---|---|
| C08L 91/06 | (2006.01) |
| C04B 28/14 | (2006.01) |
| C04B 40/00 | (2006.01) |
| C08L 23/24 | (2006.01) |
| C04B 103/65 | (2006.01) |
| C04B 111/27 | (2006.01) |
| C08K 5/01 | (2006.01) |
| C08K 5/09 | (2006.01) |

(52) U.S. Cl.
CPC ............ C04B 28/14 (2013.01); C04B 40/0039 (2013.01); C08L 23/24 (2013.01); C08L 91/06 (2013.01); *C04B 2103/65* (2013.01); *C04B 2111/27* (2013.01); *C08L 2205/02* (2013.01); *C08K 5/01* (2013.01); *C08K 5/09* (2013.01)

(58) Field of Classification Search
CPC .................................. C08L 91/06; C08L 91/08
USPC .................. 524/277, 487–489, 474, 476, 477
See application file for complete search history.

(56) References Cited

U.S. PATENT DOCUMENTS

| | | | |
|---|---|---|---|
| 2,198,776 A | 4/1940 | King et al. | |
| 3,649,319 A | 3/1972 | Smith | |
| 3,935,021 A | 1/1976 | Greve et al. | |
| 4,042,409 A | 8/1977 | Terada et al. | |
| 4,094,694 A | 6/1978 | Long | |
| 4,140,536 A | 2/1979 | Maier et al. | |
| 4,258,102 A | 3/1981 | Traver et al. | |
| 4,421,704 A | 12/1983 | Reily | |
| 4,434,196 A | 2/1984 | Robinson et al. | |
| 4,447,498 A | 5/1984 | Fink et al. | |
| 4,748,196 A | 5/1988 | Kuroda et al. | |
| 5,098,943 A * | 3/1992 | Tagawa et al. | 524/423 |
| 5,120,355 A | 6/1992 | Imai | |
| 5,126,390 A * | 6/1992 | Duff | 524/276 |
| 5,158,612 A | 10/1992 | Savoly et al. | |
| 5,177,120 A | 1/1993 | Hare et al. | |
| 5,264,028 A | 11/1993 | Beshay | |
| 5,366,810 A | 11/1994 | Merrifield et al. | |
| 5,437,722 A * | 8/1995 | Borenstein | 106/778 |
| 5,618,627 A | 4/1997 | Merrifield et al. | |
| 5,695,551 A | 12/1997 | Buckingham et al. | |
| 5,695,553 A | 12/1997 | Claret et al. | |
| 5,714,001 A | 2/1998 | Savoly et al. | |
| 5,821,298 A | 10/1998 | Reynolds et al. | |
| 5,968,237 A | 10/1999 | Sinnige | |
| 5,977,227 A * | 11/1999 | McCreight | 524/277 |
| 6,001,286 A | 12/1999 | Sleeter | |
| 6,010,596 A | 1/2000 | Song | |
| 6,051,155 A | 4/2000 | Hocken et al. | |
| 6,106,607 A | 8/2000 | Be et al. | |
| 6,171,388 B1 | 1/2001 | Jobbins | |
| 6,323,268 B1 | 11/2001 | Fisher et al. | |
| 6,403,163 B1 | 6/2002 | Fisher et al. | |

(Continued)

FOREIGN PATENT DOCUMENTS

| | | |
|---|---|---|
| CA | 2292467 | 1/2008 |
| CN | 1624206 | 6/2005 |

(Continued)

OTHER PUBLICATIONS

Arrell et al., "Polycarboxylate Comb Copolymer Dispersants and Foaming Agents for Achieving Target Properties at Reduced Water Levels", 2005, 20 pages.
"Borden Chemical Completes Combination with Resolution Performance Products and Resolution Specialty Materials to Form Hexion Specialty Chemicals", Hexion Specialty Chemicals, Inc., 2005, 2 pages.
Lee et al., "A New Generation of Gypsum Disersing Agents," Lyondell Chemical Company, Global Gypsum Conference 2003 Barcelona, Sep. 14-16, 2003, 12 pages.
"Material Safety Data Sheet Modified 30+ HA Wax", Chevron Phillips Chemical Company LP, 2008, 8 pages.
"Material Safety Data Sheet", Kenrich Petrochemicals, Inc., Dec. 2006, 6 pages.

(Continued)

*Primary Examiner* — Peter Szekely
(74) *Attorney, Agent, or Firm* — Baker & Hostetler LLP

(57) ABSTRACT

Aqueous wax emulsions are disclosed herein for use in gypsum formulations and other building products which emulsions include water; a paraffinic hydrocarbon; a montan wax component; and a hydrocarbon component. Optional emulsion and strength additives may be included in the emulsion or in a slurry formed from such emulsion for preparing a settable gypsum composition herein. The hydrocarbon component is at least one hydrocarbon compound having from 5 to 20 carbon atoms or at least one hydrocarbon resin which is based on the at least one hydrocarbon compound as a monomer, wherein the resin is at least a dimer comprising the hydrocarbon compound and the resin has a molecular weight (Mw) of no greater than about 3,000, wherein the hydrocarbon compound is saturated or unsaturated, functionalized or nonfunctionalized and is aliphatic, alicyclic, or aromatic, wherein the hydrocarbon component has a softening point of from about 22° C. to about 110° C.

20 Claims, No Drawings

(56) References Cited

U.S. PATENT DOCUMENTS

| | | | |
|---|---|---|---|
| 6,406,779 B1 | 6/2002 | Carbo et al. | |
| 6,481,171 B2 | 11/2002 | Yu et al. | |
| 6,585,820 B2 | 7/2003 | Wantling et al. | |
| 6,663,707 B2 | 12/2003 | Wantling et al. | |
| 6,811,824 B2 | 11/2004 | Hassan et al. | |
| 6,890,976 B2 | 5/2005 | Sinnige | |
| 6,890,982 B2 | 5/2005 | Borsinger et al. | |
| 6,902,615 B2 | 6/2005 | Shoshany | |
| 6,929,875 B2 | 8/2005 | Savoly et al. | |
| 7,033,432 B2 | 4/2006 | Savoly et al. | |
| 7,048,794 B2 | 5/2006 | Tagge et al. | |
| 7,192,909 B2 | 3/2007 | Richter et al. | |
| 7,220,373 B2 | 5/2007 | Martin et al. | |
| 7,267,743 B2 | 9/2007 | Borsinger et al. | |
| 7,294,189 B2 | 11/2007 | Wantling | |
| 7,544,242 B2 | 6/2009 | Liu et al. | |
| 7,563,826 B2 * | 7/2009 | Wantling et al. | 516/41 |
| 7,572,329 B2 | 8/2009 | Liu et al. | |
| 7,615,504 B2 | 11/2009 | Porter et al. | |
| 7,879,965 B2 | 2/2011 | Westerman | |
| 2002/0017222 A1 | 2/2002 | Luongo | |
| 2002/0195025 A1 | 12/2002 | Bacher et al. | |
| 2003/0131763 A1 | 7/2003 | Wantling et al. | |
| 2004/0083928 A1 | 5/2004 | Shoshany | |
| 2004/0147644 A1 | 7/2004 | Sinnige | |
| 2004/0157962 A1 | 8/2004 | Sinnige | |
| 2005/0132926 A1 | 6/2005 | Cui et al. | |
| 2006/0029785 A1 | 2/2006 | Wang et al. | |
| 2006/0029787 A1 | 2/2006 | Wang et al. | |
| 2006/0035112 A1 | 2/2006 | Veeramasuneni et al. | |
| 2006/0196391 A1 | 9/2006 | Hassan et al. | |
| 2006/0283356 A1 | 12/2006 | Donlon et al. | |
| 2007/0095723 A1 | 5/2007 | Baralt et al. | |
| 2007/0160766 A1 | 7/2007 | Copeland | |
| 2007/0181035 A1 | 8/2007 | Wantling et al. | |
| 2007/0245931 A1 | 10/2007 | Wantling | |
| 2008/0003384 A1 | 1/2008 | Murphy et al. | |
| 2008/0057290 A1 | 3/2008 | Guevara et al. | |
| 2008/0070026 A1 | 3/2008 | Yu et al. | |
| 2008/0210136 A1 | 9/2008 | Petit et al. | |
| 2008/0286609 A1 | 11/2008 | Surace et al. | |
| 2008/0312378 A1 | 12/2008 | Westerman | |
| 2009/0025850 A1 | 1/2009 | Feigin et al. | |
| 2009/0203565 A1 | 8/2009 | Dooley et al. | |
| 2010/0043344 A1 | 2/2010 | Tada et al. | |
| 2010/0116406 A1 | 5/2010 | Mahoney et al. | |
| 2010/0152347 A1 | 6/2010 | Mahoney et al. | |
| 2010/0186870 A1 | 7/2010 | Stuart et al. | |
| 2011/0257301 A1 | 10/2011 | Stuart et al. | |
| 2012/0263963 A1 | 10/2012 | Mahoney et al. | |

FOREIGN PATENT DOCUMENTS

| | | |
|---|---|---|
| CN | 101113083 | 1/2008 |
| DE | 197 32 507 A1 * | 2/1999 |
| EP | 0692924 | 1/1996 |
| EP | 1947070 | 7/2008 |
| GB | 1471713 | 4/1977 |
| JP | 59/58067 | 4/1984 |
| JP | 60/262854 | 12/1985 |
| JP | 61/042572 | 3/1986 |
| JP | 2005/004496 | 1/1993 |
| JP | 2009/165474 | 4/1995 |
| JP | 2000/218724 | 8/2000 |
| JP | 2000/233962 | 8/2000 |
| JP | 2001/181016 | 7/2001 |
| JP | 2003/106976 | 4/2003 |
| JP | 2004/034167 | 2/2004 |
| JP | 2007/018222 | 1/2007 |
| JP | 2007/102071 | 4/2007 |
| WO | WO 81/00232 | 2/1981 |
| WO | WO 02/000799 | 1/2002 |
| WO | WO 2007/061093 | 5/2007 |
| WO | WO 2008/092990 | 8/2008 |
| WO | WO 2010/025207 | 3/2010 |

OTHER PUBLICATIONS

Monte et al., "Titanates and Zirconates—Nano Technology in Coatings 2007", Kenrich Petrochemicals, Inc., 2007, 291 pages (See pp. 1-40).

Monte, "Titanates", Kenrich Petrochemicals, Inc., 1987, Chapter 4, 26 pages.

Pingel, "Studies on Bonding in Paper—Gypsum Composite Structures—A Thesis," Chapter 5.1.2 Coupling Agent Additions, May 1990, 14 pages (see pp. 99-108, 163-165).

Poirier et al., "Cross-Flow Filtration Demonstration for Slurries Containing High Level Waste Sludge and Monosodium Titanate", Westing House Savannah River Company, Dec. 12, 2001, 27 pages.

"Polyethylene Wax", HP Wax Hase Petroleum Wax, Co, http://www.hpwax.com/polyethylene_was.htm, 2008, 2 pages.

"Product Data Sheet, Ken-React LICA 09—Titanate Coupling Agent", Sep. 26, 2007, 2 pages.

"Specialty Chemicals", Chevron Phillips Chemical Company LP, http://www.cphem.com/enu/nao_specialty_chemicals.asp, 2005, 8 pages.

"Synthemul HS-200", Reichold, Product Bulletin, Mar. 2004, 3 pages.

"Synthetic Wax", HP Wax Hase Petroleum Wax, Co., http://www.hpwax.com/synthetic$_{13}$ wax.htm, 2008, 6 pages.

Technical Data Sheet, Mowlilith DM 137, Celanese Emulsions, Mar. 2006, 2 pages.

Technical Data Sheet, VINNAPAS 192 (CGN), Wacker Polymers, Feb. 4, 2010, 3 pages.

Technical Data Sheet, VINNAPAS 323, Wacker Plymers, Oct. 6, 2009, 2 pages.

Technical Data Sheet, VINNAPAS 400, Wacker Polymers, Oct. 6, 2009, 3 pages.

Technical Data Sheet, VINNAPAS 401, Wacker Polymers, Oct. 22, 2009, 2 pages.

Technical Data Sheet, VINNAPAS 410, Wacker Polymers, Oct. 20, 2009, 3 pages.

Technical Data Sheet, VINNAPAS 426, Wacker Polymers, Oct. 6, 2009, 2 pages.

Technical Data Sheet, VINNAPAS 465, Wacker Polymers, Oct. 7, 2009, 2 pages.

Technical Data Sheet, VINNAPAS 920, Wacker Polymers, Nov. 11, 2009, 3 pages.

Technical Data Sheet, VINNAPAS EP1400, Wacker Polymers, Mar. 16, 2009, 3 pages.

Tomasiewicz "The Adhesion of Paperboard to the Gypsum Core of Wallboard: An Investigation of Adhesive Bond Quality in Response to Paper Production Variables and Relative Humidity," Jun. 2003, 77 pages (see pp. 20-21).

"TufCOR 3610", Celanese Emulsion Polymers, Jul. 2009, 1 page.

Technical Data Sheet VINNAPAS 400, Wacker Polymers, Sep. 18, 2009, 3 pages.

* cited by examiner

AQUEOUS WAX EMULSIONS HAVING REDUCED SOLIDS CONTENT FOR USE IN GYPSUM COMPOSITIONS AND BUILDING PRODUCTS

CROSS-REFERENCE TO RELATED APPLICATIONS

This application claims the benefit under 35 U.S.C. §119 (e) to U.S. Provisional Patent Application No. 61/446,492, filed Feb. 24, 2011, the entire disclosure of which is incorporated herein by reference.

BACKGROUND OF THE INVENTION

1. Field of the Invention

The invention relates to the field of wax emulsions and mixtures for addition to settable gypsum formulations and other construction and building formulations, and more particularly to the field of such mixtures and emulsions for making gypsum wallboards having low water absorption and low solids content.

2. Description of Related Art

Gypsum wallboard is used for forming interior and exterior walls of many building structures. The structure of the wallboard typically includes a gypsum composition which is generally prepared as a slurry composition, which is placed between two liners and set. Such wallboard gypsum compositions may be standard wallboard formulations or made to be water-resistant through, for example, the use of various wax emulsions. Some of the more common commercial water-resistant wax emulsions involve use of particular wax components (which may include a single wax, or more typically, a blend of waxes), saponifying agent(s), emulsifier(s), stabilizer(s) and other additives.

Of growing importance in the wallboard industry is the ever-increasing cost of manufacture of wallboard with respect to the rising cost of formulation components as well as increasing energy costs. For example, it is known in the art that manufacturing methods for formation of building products like gypsum wallboard that use emulsions in formation of the finished products, typically require a drying step or steps that consume energy. Thus, it would be beneficial to manufacture gypsum wallboard (standard and water-resistant) if the drying energy could be reduced for cost savings, particularly when energy demands are growing for manufacturers. Components, time and steps required in manufacture are also a concern, as is the quality of the resulting wallboard.

With respect to the manufacture of water-resistant wallboards, U.S. Pat. No. 5,437,722 describes a water-resistant gypsum composition and wax emulsion therefor, which includes a paraffin hydrocarbon having a melting point of about 40° C. to 80° C., about 1 to 200 parts by weight montan wax per 100 parts of the paraffin hydrocarbon, and about 1 to 50 parts by weight polyvinyl alcohol per 100 parts of the paraffin hydrocarbon. The use of montan wax in the wax emulsion for water-resistant wallboard has been very effective and provides excellent performance. Other water-resistant formulations based on natural waxes other than montan (such as carnauba, bees wax or colophonium resin) and/or synthetic waxes (such as Fischer-Tropsch wax) have been used as well as alternative water-resistant wax formulations. Most such formulations provide good water-resistance in gypsum wallboard formulations.

Synthetic and natural waxes as noted above are used in the building products and gypsum wallboard industries for waterproofing and in oriented strand board. Among such natural waxes used in the building products industry, particularly for water-resistant gypsum wallboard, montan wax as noted above is prevalent. Montan wax is a lignite-wax, including chemical components formed of long chain alkyl acids and alkyl esters having chain lengths of about 24 to 30 carbons. In addition, natural montan includes resin acids, polyterpenes and some alcohol, ketone and other hydrocarbons such that it is not a "pure" wax. The saponification number of montan, which is a saponifiable wax, is about 92 and its melting point is about 80° C. Montan wax while highly effective has its drawbacks in that it is not always sufficiently pure and as a natural wax, tends to have some inconsistencies in formulation and more importantly, is available only in limited supply from a natural source which is generated primarily in Germany, such that the wax is becoming more expensive and obtaining adequate supply is becoming an issue for manufacturers of such wax emulsions.

Further, while strong water-resistance can be achieved, it would be desirable to achieve good water resistance properties in gypsum wallboard, while lowering the cost of components, reducing cost of supply and/or manufacturing costs by providing for lower solids content in the additive emulsion and improving slurry viscosity to avoid the need for added water during manufacturing. Further, similar emulsions are used in oriented strand board and other building and construction applications such that reduction in cost for such emulsions is desirable.

Accordingly, there is a need in the art for compositions and methods that improve the properties of gypsum wallboard or other building and construction formulations, while preferably also keeping the costs of manufacturing including reducing energy costs, reducing cost of materials, and in the case of gypsum wallboard, also improving gypsum slurry viscosity such that lower amounts of water are needed to form a suitable slurry for gypsum board formulation and thus improve drying times, while at the same time providing the same or better water resistance properties as prior waterproof or water resistant gypsum wallboard.

BRIEF SUMMARY OF THE INVENTION

The present invention provides an aqueous wax emulsion which incorporates a hydrocarbon component a hydrocarbon component which is either or both of at least one hydrocarbon compound having from 5 to 20 carbon atoms or at least one hydrocarbon resin which is based on the at least one hydrocarbon compound as a monomer. In the case of a resin, the resin is at least a dimer of the hydrocarbon compounds herein and the resin has a molecular weight (Mw) of no greater than about 3,000. The hydrocarbon compound may be saturated or unsaturated, functionalized or nonfunctionalized and is aliphatic, alicyclic, or aromatic. It further preferably has a softening point of from about 22° C. to about 110° C.

Such hydrocarbon component may be used in some embodiments to replace some of the paraffinic hydrocarbon component of the emulsion at least in part, and in doing so, provides the unique property to the emulsion that it has a low solids content and can thus accommodate more water therein, while still retaining or improving its ability to resist absorption of water. By incorporating more water in the emulsion, less water is required in a gypsum slurry incorporating the emulsion to achieve desired viscosity and other thixotropic properties. Manufacturing costs can be made lower by easier drying times and by reducing cost of the aqueous wax emulsion required for forming water-resistant gypsum board by reducing solids in the emulsion composition.

In one embodiment herein, the invention includes an aqueous wax emulsion for use in a gypsum formulation, comprising: water; a paraffinic hydrocarbon; a montan wax component; and a hydrocarbon component which is at least one hydrocarbon compound having from 5 to 20 carbon atoms or at least one hydrocarbon resin which is based on the at least one hydrocarbon compound as a monomer, wherein the resin is at least a dimer comprising the hydrocarbon compound and the resin has a molecular weight (Mw) of no greater than about 3,000, wherein the hydrocarbon compound is saturated or unsaturated, functionalized or nonfunctionalized and is aliphatic, alicyclic, or aromatic, and wherein the hydrocarbon component has a softening point of from about 22° C. to about 110° C., more preferably from about 65° C. to about 110° C.

In such an embodiment, water may comprise about 60 parts to about 80 weight percent of the emulsion, preferably at least about 70 weight percent of the emulsion; the montan wax component may comprise is about 1 part to about 200 parts by weight per 100 parts of the combined weight of the hydrocarbon component and the paraffinic hydrocarbon, more preferably about 1 part to about 50 parts by weight per 100 parts by weight of the combined weight of the hydrocarbon component and the paraffinic hydrocarbon; and the ratio of the hydrocarbon component to the paraffinic hydrocarbon is preferably from about 0.004:1 to about 2:1, more preferably about 0.02:1 to about 1:1, and most preferably about 0.05 to about 0.4:1

The montan wax component may consists essentially of montan wax or include a montan wax substitute or a combination of a montan wax and montan wax substitute. Suitable montan wax substitute may be synthetic normal α-olefin wax, a synthetic olefin wax of a carbon chain length of about 20 or more carbon atoms that is modified by oxidizing and/or refining through distillation or stripping, natural or synthetic carnauba wax, palm wax, Fischer-Tropsch wax, polymeric alkenes, oxidized polyethylene waxes, and mixtures, blends and derivatives thereof.

The hydrocarbon component is preferably selected from several groups of resins an compounds including: (i) an aromatic petroleum hydrocarbon resin formed by aromatic petroleum distillate products and having a molecular weight of about 1,000 or less and a softening point of about 90° C. to about 100° C. and phenol-functionalized resins, acid-functionalized resins, and esters thereof; (ii) an aromatic hydrocarbon compound or resin taken from a petroleum distillate fraction of C5 to C9 components, having a softening point of about 75° C. to about 105° C. and phenol-modified compounds and resins, acid-modified compounds and resins, and esters thereof; (iii) terpene resins and terpene phenolic resins; (iv) rosin, rosin esters, pentaerthyritol-containing rosins, pentaerythritol-containing rosin esters, and acid-modified rosins; (v) acid-modified resins, pentaerythritol-containing resin esters; (vi) aliphatic and alicyclic hydrocarbon resins of softening points from about 95° C. to about 105° C.; (vii) coumarone-indene resins having a softening point of about 20° C. to about 100° C.; (viii) alkyl-, alkenyl-, alkynl-, or aryl-functionalized naphthalene esters; and (ix) alicyclic compounds selected from the group of phenols, terpenes, indenes, naphthas, naphtalenes and alkyl-, alkenyl, alkynl-, aryl-functionalized compounds thereof.

The paraffinic hydrocarbon is preferably a wax having a melting point of about 40° C. to about 80° C., and may be present in amounts of about 1 to about 50 parts by weight of a stabilizer per 100 parts by weight of the weight of the paraffinic hydrocarbon and the hydrocarbon component. A stabilizer is preferably provided as well, such as a polyvinyl alcohol which is at least 90% hydrolyzed, and preferably about 97% to 100% hydrolyzed.

In addition, the emulsion may include about 1 to about 5 percent by weight of the emulsion of an emulsifier, such as a nonionic surfactant and/or an anionic surfactant. The emulsion may also include about 0.01 weight percent to about 5 weight percent of the emulsion of a saponifying agent, such as an alkali metal, for example potassium hydroxide. About 0.01 weight percent to about 2 weight percent of a dispersant and/or a surfactant having a sulfur-containing group, such as lignosulfonic acid, naphthalene sulfonic acid, derivatives and/or sulfonate salts thereof may also be included in the emulsion.

In a further embodiment, an aqueous wax emulsion is included in the invention which comprises (a) at least about 70 weight percent water; (b) about 15 weight percent to about 18 weight percent paraffinic hydrocarbon wax having a melting point of about 40° C. to about 80° C.; (c) about 0.1 to about 1 weight percent of an alkali metal; (d) about 2 to about 5 weight percent montan wax and/or a montan wax substitute; (e) about 0.1 weight percent to about 10 weight percent of polyvinyl alcohol which is at least 97% hydrolyzed; and (f) about 0.1 weight percent to about 10 weight percent of a hydrocarbon component which is at least one hydrocarbon compound having from 5 to 20 carbon atoms or at least one hydrocarbon resin which is based on the at least one hydrocarbon compound as a monomer, wherein the resin is at least a dimer comprising the hydrocarbon compound and the resin has a molecular weight (Mw) of no greater than about 3,000, wherein the hydrocarbon compound is saturated or unsaturated, functionalized or nonfunctionalized and is aliphatic, alicyclic, or aromatic, wherein the hydrocarbon component has a softening point of from about 22° C. to about 110° C.

As noted above, the hydrocarbon component may be one of the following groups of materials: (i) an aromatic petroleum hydrocarbon resin formed by aromatic petroleum distillate products and having a molecular weight of about 1,000 or less and a softening point of about 90° C. to about 100° C. and phenol-functionalized resins, acid-functionalized resins, and esters thereof; (ii) an aromatic hydrocarbon compound or resin taken from a petroleum distillate fraction of C5 to C9 components, having a softening point of about 75° C. to about 105° C. and phenol-modified compounds and resins, acid-modified compounds and resins, and esters thereof; (iii) terpene resins and terpene phenolic resins; (iv) rosin, rosin esters, pentaerthyritol-containing rosins, pentaerythritol-containing rosin esters, and acid-modified rosins; (v) acid-modified resins, pentaerythritol-containing resin esters; (vi) aliphatic and alicyclic hydrocarbon resins of softening points from about 95° C. to about 105° C.; (vii) coumarone-indene resins having a softening point of about 20° C. to about 100° C.; (viii) alkyl-, alkenyl-, alkynl-, or aryl-functionalized naphthalene esters; and (ix) alicyclic compounds selected from the group of phenols, terpenes, indenes, naphthas, naphtalenes and alkyl-, alkenyl, alkynl-, aryl-functionalized compounds thereof.

The invention further includes a method of making an aqueous wax emulsion, comprising (a) combining a hydrocarbon component into a paraffinic hydrocarbon to form a first combined emulsion component, wherein the hydrocarbon component is at least one hydrocarbon compound having from 5 to 20 carbon atoms or at least one hydrocarbon resin which is based on the at least one hydrocarbon compound as a monomer, wherein the resin is at least a dimer comprising the hydrocarbon compound and the resin has a molecular weight (Mw) of no greater than about 3,000, wherein the hydrocarbon compound is saturated or unsaturated, functionalized or nonfunctionalized and is aliphatic, alicyclic, or aromatic, and wherein the hydrocarbon component has a softening point of from about 22° C. to about 110° C.; (b) combining the first combined emulsion component into a montan wax and/or montan wax substitute to form a second combined emulsion component; and (c) emulsifying the second combined emulsion component.

In the method of making an aqueous wax emulsion noted above, after step (b) and before step (c), the method may further comprises combining a hot aqueous solution of a polyvinyl alcohol stabilizer, which is at least about 90% hydrolyzed with the second combined emulsion component. The hot aqueous solution of the polyvinyl alcohol may include at least one additive selected from the group consisting of an emulsifier; a saponifying agent; and a dispersant and/or a surfactant having a sulfur-containing group, and mixtures and combinations thereof.

The invention also includes a settable gypsum composition, comprising: (a) a gypsum slurry, comprising water; and (b) an aqueous wax emulsion comprising: (i) water; (ii) a paraffinic hydrocarbon; (iii) a montan wax component; and (iv) a hydrocarbon component which is at least one hydrocarbon compound having from 5 to 20 carbon atoms or at least one hydrocarbon resin which is based on the at least one hydrocarbon compound as a monomer, wherein the resin is at least a dimer comprising the hydrocarbon compound and the resin has a molecular weight (Mw) of no greater than about 3,000, wherein the hydrocarbon compound is saturated or unsaturated, functionalized or nonfunctionalized and is aliphatic, alicyclic, or aromatic, wherein the hydrocarbon component has a softening point of from about 22° C. to about 110° C. A dispersant may also be provided to the settable composition through addition to the gypsum slurry and/or the wax emulsion. Such a dispersant may be lignosulfonic acid, naphthalene sulfonic acid, and combinations and salts thereof.

In one embodiment, the settable gypsum composition may also include one or more additives that can provide enhance strength and or wettability properties. The composition may thus include a first additive comprising a vinyl acetate/ethylene copolymer in latex or emulsion form and/or a second additive which is at least one of (i) a wetting agent and/or a surfactant; (ii) a titanium coupling agent, (iii) a zirconium coupling agent, and (iv) mixtures thereof.

The second additive preferably comprises the wetting agent and/or the surfactant, which may have an HLB of from about 3 to 16. The wetting agent and/or the surfactant may be one or more of fatty alcohols, ethoxylated alcohols, vegetable oil ethoxylates, alkyl phenol ethoxylates, monobasic esters, silicone polyethers, alkylated or alkenylated pyrrolidone-based compounds, asphaltene dispersants, acetylenic diols, ethylene oxide/polyethylene oxide block copolymers, polyethylene glycols, polyethylene glycol esters, alkylbenzenesulfonic acids, alkylbenzene sulfonate, sodium salts, potassium salts, amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants.

The settable gypsum composition preferably comprises about 0.5 parts by weight to about 20 parts by weight of wax emulsion solids from the aqueous wax emulsion to about 100 parts of gypsum.

DETAILED DESCRIPTION OF THE INVENTION

The compositions herein provide lower solids wax emulsions that in use provide excellent water resistance and emulsion properties (viscosity, specific gravity, blendability, etc.) for use in water-resistant gypsum wallboard or even in oriented strand board as an additive, while at the same time reducing the solids requirement and incorporating more water in the emulsion so that the cost of the emulsions may be reduced and when combining into a gypsum composition for making wallboard, manufacturing costs can be lowered and energy in drying time saved. Further, such compositions may include wettability and enhanced strength additives which can be used to modify gypsum compositions formed using the emulsions herein when making wall board. Such compositions are made using the aqueous wax emulsions described herein for providing water-resistance. Some embodiments are able to reduce energy costs and provide manufacturing cost savings by providing good or improved slurry viscosity as well reduction in water content to enable drying times and/or temperature (heat use) reduction and to improve thixotropic and rheological properties of the compositions. The wax emulsions herein may also be provided to other building and construction formulations including oriented strand board at reduced cost without significant if any sacrifice of properties.

The aqueous emulsions herein include as a primary component water. The water used to prepare the aqueous emulsion may be suitable industrial water, tap water, distilled or deionized water, etc., and is generally used in the emulsion in an amount of about 60% to about 80% by weight, and preferably at least about 70% by weight of the weight of the emulsion.

The emulsions also include a paraffinic hydrocarbon. Such paraffinic hydrocarbons are known in the art of aqueous wax emulsions useful for formation of gypsum wallboard and may be any suitable paraffin-based wax that functions compatibly with the other wax component(s) herein and with the hydrocarbon component as described below. The paraffinic hydrocarbon is preferably a hydrocarbon wax having a melting point of about 40° C. to about 80° C., which properties are favorable for water-resistant wallboard manufacture, although for other building products applications such as for oriented strand board, other paraffin waxes may be used as well. Preferably, such paraffinic hydrocarbon makes up about 10 to about 24 weight percent of the emulsion, more preferably about 15 to about 18 weight percent of the emulsion, and most preferably about 16 to about 18 weight percent of the emulsion.

A hydrocarbon component is also provided as noted above. The component is one or more of a class of materials which are hydrocarbon compounds or resins formed therefrom (natural and synthetic). The hydrocarbon compounds are preferably saturated or unsaturated compounds which may have various optional functionalized groups or may be non-functionalized. By "functionality" herein, the group may be naturally present or synthesized to be added on the compound through reaction, grafting or other chemical procedures. Suitable functional groups are carboxylic acid groups; sulfur-containing groups; mercapto groups; carboxyl groups; hydroxyl groups; phenolic groups; nitrogen-containing groups such as amines and the like; ketones; aldehydes; acrylates; aliphatic, aromatic or alicyclic alcohols; fluorinated groups, and alkylated, alkenylated, alkynylated, arylated, or similar side-chain groups which may be further functionalized by the other groups noted above. Functionality is preferably attached to a carbon in the chain, but atoms or molecules may also be introduced into the chain or structure, for examples, nitroso groups, esters, ethers and the like.

Such hydrocarbon compounds preferably have a structure which is itself aliphatic, alicyclic or aromatic in nature, and the compounds also have a softening temperature which is preferably about 22° C. to about 110° C., more preferably about 65° C. to about 110° C.

The compounds can be used in the monomeric form or can be dimerized, trimerized, oligomerized form or in a resin form, either natural or synthetic which is made from such compounds. Such compounds and resins may be further derivatized if desired by a user to provide compatibility, reactivity or other properties. The resins preferably have a molecular weight (Mw) of no greater than about 3,000 and preferably less than 2,000 and most preferably of about 500 to about 1,000. Such compounds or resins as used in the hydrocarbon component may be one single compound or resin, or a mixture, blend or alloy of two or more such compounds and/or resins.

Collectively, they form a hydrocarbon component which is preferably present in the emulsion in an amount of 0.1 to about 10 weight percent of the emulsion. However, depending upon the compound or resin chosen, the precise amount may be higher or lower to achieve the desired effect which is to provide properties to the end emulsion which are preferably at least as good as or better to those achieved by prior aqueous wax emulsions as used in gypsum wallboards, oriented strand board or other building products, while reducing the overall solids content of such emulsions and using more water in the emulsion. One such commercial prior art aqueous emulsion is provided by Henry Company as Aqualite® 70 and such emulsion as well as other prior art emulsions are described in various prior patents, including for example, U.S. Pat. No. 5,437,722. The properties maintained are most importantly the water resistance properties of the emulsion, however, thixotropic and rheological properties as well as specific gravity properties that are similar to or better than those of prior emulsions for use in settable gypsum formulations and other building and construction formulations.

Examples of such compounds include aromatic petroleum hydrocarbon resin formed by aromatic petroleum distillate products and having a molecular weight of about 1,000 or less and a softening point of about 90° C. to about 100° C. and phenol-functionalized resins, acid-functionalized resins, and esters thereof. Commercially available compounds in this group include various Novares® resins from Rütgers Chemicals GmbH in Germany formed from petroleum steam-cracked distillates, Akron alicyclic hydrocarbon resins from Arakawa Chemicals, and similar compounds. Further, one may use an aromatic hydrocarbon compounds or resins taken from a petroleum distillate fraction of C5 to C9 components, having softening points of about 75° C. to about 105° C. as well as phenol-modified compounds and resins, acid-modified compounds and resins, and esters thereof. Commercially available compounds are available under the trade name Hikotack® P-90 from Kolon Industries in Korea, Norsolene® M1090 and Wingtack® 86, both available from Cray Valley in France, Escorez® 2101 and similar compounds such as Novares methylstryenated phenols.

Other resins which may be used in the hydrocarbon component include terpene resins and terpene phenolic resins such as those available from Arizona Chemical under the name Sylvatac®, and rosin, rosin esters, pentaerthyritol-containing rosins, pentaerythritol-containing rosin esters, and acid-modified rosins, acid-modified resins, pentaerythritol-containing resin esters such as those sold under the name Novares® from Rütgers Chemicals GmbH and Sylvalite® also from Arizona Chemical. The hydrocarbon component may also include aliphatic and alicyclic hydrocarbon resins of softening points from about 95° C. to about 105° C. such as those available from Struktol Co. as well as under the name Akron which are available from Arakawa Chemical. Coumarone-indene resins having a softening point of about 20° C. to about 100° C. may also be used. Examples of such resins are available under the name Novares® from Rütgers Chemical GmbH. Further, alkyl-, alkenyl-, alkynl-, or aryl-functionalized naphthalene esters, such as diisopropyl naphthalene ester in liquid form available as Novares® H-1100 from Rütgers Chemical GmbH and various other alicyclic compounds selected from the group of phenols, terpenes, indenes, naphthas, naphtalenes and alkyl-, alkenyl-, alkynl-, aryl-functionalized compounds thereof may also be used in the hydrocarbon component.

The hydrocarbon component may be added to a commercial aqueous wax emulsion for use in the building products areas, but is preferably added to the emulsion during manufacture by a method as described herein, and as a substitute for a portion of the paraffinic hydrocarbon normally used in such compositions. Whereas other waxes are provided to such emulsions based on 100 parts by weight of a base paraffinic hydrocarbon, the emulsions herein blend wax components based on 100 parts by weight of the combined weight of the paraffinic hydrocarbon and the hydrocarbon component being substituted for a portion of that paraffinic hydrocarbon in the emulsion. The ratio of the hydrocarbon component to the paraffinic hydrocarbon is preferably about 0.004:1 to about 2:1, more preferably about 0.02:1 to about 1:1, and most preferably about 0.05 to about 0.4:1.

The emulsions herein further include a montan wax component. The montan wax component as noted above may include only montan wax, or can be a montan wax substitute known in the art, or a combination of montan wax and a montan wax substitute known in the art. The montan wax component is preferably present in an amount of about 1 part to about 200 parts by weight, and preferably about 1 part to about 50 parts by weight of montan component per 100 parts by weight of the combined paraffinic hydrocarbon and hydrocarbon component described above. It is preferably about 2 to about 5 weight percent of the emulsion.

The montan wax component may include montan wax which is a lignite-wax, including chemical components formed of long chain alkyl acids and alkyl esters having chain lengths of about 24 to 30 carbons. Natural montan includes resin acids, polyterpenes and some alcohol, ketone and other hydrocarbons such that it is not a "pure" wax. The saponification number of montan, which is a saponifiable wax, is about 92 and its melting point is about 80° C. The montan wax component of the emulsion may instead include a suitable montan wax substitute or can include montan wax and a wax substitute in combination.

Suitable substitutes include those described in U.S. Publication US-2010-0116406-A1 (application Ser. No. 12/614,984) which is incorporated herein in relevant part by reference and describes use of a synthetic normal α-olefin wax; a synthetic olefin wax of a carbon chain length of about 20 or more carbon atoms, that is modified by oxidizing and/or by refining through distillation or stripping; and combinations thereof. Other synthetic montan substitutes for use in the montan wax component include natural carnauba wax, palm wax, Fischer-Tropsch wax, polyethylene wax, oxidized polyethylene wax, polymeric alkenes and their derivatives, siloxanes (with and without catalytic or other additives, which are known for use as water-resistant wax formulation substitutes for preparing water-resistant gypsum wallboard as described in U.S. Patent Publication No. 2006-0035112-A1 for example), bleached or refined montan, bees wax, coliphonium resin, synthetic carnauba wax and the like, either as individual components or in various blends with montan wax and/or with each other.

In preferred embodiments herein of the aqueous wax emulsion, a stabilizer is provided to the emulsion. Preferably, the stabilizer is polyvinyl alcohol or a similar material, and preferably a polyvinyl alcohol which is prepared by hydrolysis of polyvinyl acetate and is preferably a substantially completely or fully hydrolyzed polyvinyl alcohol. Most preferably it is at least about 90% hydrolyzed polyvinyl alcohol, and more preferably 97% to 100% hydrolyzed polyvinyl alcohol. Most preferably the polyvinyl alcohols used are soluble in water at elevated temperatures of about 60° C. to about 95° C., but are insoluble in cold water. The polyvinyl alcohol may be present in an amount of about 1 part to about 50 parts, preferably about 1 part to about 20 parts, by weight, per 100 parts of the combined weight of the paraffinic hydrocarbon and the hydrocarbon component. The polyvinyl alcohol can enhance water resistance as well. Preferably, use of such a polyvinyl alcohol or other stabilizer is about 0.1 to about 10 weight percent of the emulsion.

Optional emulsifier(s) may also be provided. Suitable emulsifiers for use in the emulsion of the invention include nonionic surfactants such as alkylphenoxypoly(ethyleneoxy) ethanols, sorbitan fatty acid esters and polyoxyethylene sorbitan fatty acid esters and anionic surfactants such as saponified fatty acids, and, if used, may be present in an amount of about 0.1% to about 5%, by weight, and preferably about 1% to about 5% by weight of the emulsion. Other generally known emulsifiers or those to be developed which are useful in wax emulsions and which do not have a deleterious effect on the formulation may be used.

Also useful in an aqueous wax emulsion according to an embodiment herein is a saponifying agent(s) (saponifiers) which may include alkali metals, potassium hydroxide, ammonium hydroxide, magnesium sulfate, sodium hydroxide or a similar material, and most preferably potassium hydroxide. Saponifiers may be present in an amount of no greater than about 5 weight percent of the emulsion, preferably no greater than about 2 weight percent and most preferably about 0.01 weight percent to about 1 weight percent of the emulsion. Other saponifying agents known or to be developed which are known to be useful in wax emulsions may be used as well.

Dispersants and/or surfactants of types known in the art may be used in preferred embodiments of the aqueous wax emulsions described herein. Preferred dispersants, include, but are not limited to those having a sulfur or a sulfur-containing group(s) in the compound such as sulfonic acids (R—S(=O)$_2$—OH) and their salts, wherein the R groups may be otherwise functionalized with hydroxyl, carboxyl or other useful bonding groups. Preferred are higher molecular weight sulfonic acid compounds such as lignosulfonic acid, naphthalene sulfonic acid, the sulfonate salts of these acids and derivatized or functionalized versions of these materials. In addition, other dispersants known in the art for use in wax emulsions, such as magnesium sulfate; ammonium hepta molybdate/starch combinations; non-ionic surfactants, ionic surfactants, zwitterionic surfactants and mixtures thereof; and alkyl quaternary ammonium montmorillonite clay as well as other known dispersants may be used. Similar materials may also be used herein, provided they are compatible with and perform well with the formulation components. Dispersants and/or surfactants are preferably present in an amount of about 0.01 percent by weight to about 2 percent by weight of the wax emulsion, and preferably about 0.1 percent to about 2 percent by weight of the wax emulsion.

A method of making an aqueous wax emulsion is also described herein. Preferably, the hydrocarbon component as described hereinabove and paraffinic hydrocarbon as described also above are combined to form a first combined emulsion component. This may be done by heating to the molten state and then blending together. This component is then combined with the montan wax component noted above to form a second combined emulsion component. The second combined emulsion component is then emulsified using any suitable emulsification technique known or to be developed in the art. If stabilizers and other components are used, a hot aqueous solution of the polyvinyl alcohol containing the emulsifiers, any other stabilizers and other components noted above for use in the aqueous wax emulsion of the invention may then be passed with the hot blend of the waxes through a colloid mill and the resulting emulsion is allowed to cool.

Alternatively, a homogenizer may be used instead of a colloid mill. Such homogenizers may be the same general type of equipment used to homogenize milk and other products. In such a method, a mixture of the wax component and the emulsifying components are fed under high pressure (typically about 1500 psi to about 3500 psi) to emulsify the waxes and create a smaller particle size than is typically associated with use of a colloid mill. It will be understood by one skilled in the art based upon this disclosure that other manufacturing methods and types of equipment and procedures for preparing the emulsion can be used, as are known or which may be developed in the art. The emulsion of the invention may also readily be reformed by agitation, in the event that emulsified components of the emulsion separate on storage.

A settable gypsum composition is also described herein which includes a gypsum slurry which having water therein and the aqueous wax emulsion described above. The emulsion is preferably added so that in the composition, there are about 0.5 parts by weight to about 20 parts by weight of wax emulsion solids to about 100 parts by weight of gypsum. The gypsum composition may include a dispersant as noted above (for example, lignosulfonic acid, naphthalene sulfonic acid or combinations thereof) which may be added to the emulsion and/or the gypsum slurry. Various strength additives and/or wettability additives as described in co-pending application filed by the assignee of the present application may be provided to the slurry as optional components. Thus, the gypsum formulation may include at least a first strength additive(s), that includes a vinyl acetate/ethylene copolymer(s) in latex or emulsion form (added singularly or in combination) and a second additive which is one or more of a wetting agent and/or a surfactant; a titanium coupling agent, a zirconium coupling agent, and mixtures and combinations of the wetting agent(s), surfactant(s) and titanium and/or zirconium coupling agents. The combination of the first and second additives provides a gypsum product, such as a gypsum wallboard having enhanced strength for the gypsum formulation and better adhesion of the calcium-based components within the gypsum core, thus providing enhanced strength throughout the thickness of the board.

If such additives are used, they may be provided to the gypsum slurry in weight ratios of about 0.001:100 to about 10.0:100. Such gypsum slurries may be any gypsum slurry formed in accordance with use of the aqueous wax emulsions described herein. They may be a standard calcium sulfate hemihydrate and water slurry normally used to form a gypsum core, wherein the calcium sulfate hemihydrate is able to react with water in the slurry to form an interlocking matrix of calcium sulfate dihydrate crystals, and to thereby set and cure to form a hard gypsum board and wherein such slurry includes the aqueous wax emulsions herein. Water is typically added to the slurry in excess of what is needed for the setting hydration reaction, as some water is provided for fluidity out of the slurry mixing equipment for shaping the board into the proper width and thickness.

The first such additives that may be used herein for providing strength and core adhesion, may be any of a variety of vinyl acetate latex or emulsion polymers and copolymers, such as alkyl vinyl acetate and alkylene vinyl acetate latex or emulsion polymers and copolymers, and more preferably ethyl vinyl acetate or ethylene vinyl acetate copolymers in latex or emulsion form. Similar latex or emulsion vinyl-based polymers or copolymers that can enhance the basic strength and adhesion capabilities of the core gypsum slurry may also be used. Other suitable strength enhancing additives may include vinyl acetate/acrylate copolymers, alkyl or alkylene vinyl acetate/acrylate copolymers. Preferably such polymers are provided in latex or emulsion form for better penetration and adhesion within the slurry. Such copolymers may also be functionalized with groups that can enhance the strength function or compatibility of the polymers, wherein functional groups can be provided off a primary or secondary polymer chain, such as phosphorus-, potassium-, sulfur-, and calcium-containing groups and/or salts; halogens such as bromine, iodine, fluorine and the like; halogenated alkyl or alkylene groups; metal or metalloid ions or complexes; and aromatic or aryl functionalized groups.

Commercially available suitable ethylene vinyl acetate copolymers are available from Celanese Emulsion Polymers as TufCOR® 3610, Dur-O-Set®3610, Dur-O-Set®137A, and as Mowilith® 137A. Other suitable copolymers are available from Wacker Chemie, AG, Germany, include (vinyl alcohol) stabilized vinyl acetate-ethylene copolymer dispersions sold under the name Vinnapas®, such as Vinnapas® 323, Vinnapas® 400, Vinnapas® 400 H, Vinnapas® EF 811, Vinnapas® 192, Vinnapas® 400, vinyl acetate ethylene copolymer emulsions from Forbo, Switzerland sold under the name Elvace® CPS, such as CPS 137A and CPS786, and VAEs from Reichhold, N.C., US sold under the name Synthemul® HS200, from Hersteller Kuraray Co., Ltd. as CP-Polymer®, CP1210 T30, and from AirProducts, Inc. as AirFlex® EN1165.

The composition also includes a second additive which may be a wetting agent and/or a surfactant used alone or in combination with an organic zirconium compound and/or an organic titanium compound.

Wetting agents and/or surfactants which may be used are materials which preferably have an HLB of from about 3 to 16. Non-limiting examples of such wetting agents and/or surfactants include fatty alcohols, ethoxylated alcohols, vegetable oil ethoxylates, alkyl phenol ethoxylates, monobasic esters, silicone polyethers, alkylated or alkenylated pyrrolidone-based compounds, asphaltene dispersants, acetylenic diols, ethylene oxide/polyethylene oxide block copolymers, polyethylene glycols, polyethylene glycol esters, alkylbenzenesulfonic acids, alkylbenzene sulfonate, sodium salts, potassium salts, amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants.

The wetting agents and/or surfactants can be used independently or in blends of more than one material. Such materials may be cationic, anionic or zwitterionic, although cationic materials are preferred if working with a harder, more ionic water and to avoid excessive foam which may arise with some anionic surfactants. Wetting agents and/or surfactants are preferred if they are more neutral with respect to foam formation. While some foaming is necessary, it is preferred to avoid excessive foaming as it may negatively impact wallboard characteristics.

Silicone polyethers noted above may be, for example, one of the following (commercially available from Siltech Corporation): silicone polyethers (available under the trade name Silsurf®); phosphate silicone polyether ethers (available under the trade name Silphos®); silicone polyether quaternary compounds (available under the name Silquat®); silicone polyether alkyl polyethers (available under the trade name Silube®); silicone defoamers (available under the trade name Siltech®); fluorinated silicones (available under the trade name Fluorosil®); or silicone pre-polymers (available under the trade name Silmer®). Other similar compounds are available from other manufacturers as well. For example, the additive may be one of the following (commercially available from Momentive Performance Materials): silicone copolymer/polyalkylene oxide blends or polyalkyleneoxide modified polydimethylsiloxanes (available under the trade name Silwet®, including Hydrostable®). The additive may also be an alternative modified polysiloxane (available under the trade name Silbyk® products, commercially available from Byk Additives and Instruments).

If a pyrrolidone-based compound is used as a wetting agent, it is preferably one which has an alkyl or alkenyl group bonded to the structure in preferably the 1 position of the molecule (N position). Examples of such compounds include a 1-octyl 2-pyrrolidone (available under the trade name Surfadone® LP100 from International Specialty Products (ISP)), 1-vinyl 2-pyrrolidone, or most preferably 1-dodecyl 2-pyrrolidone (available under the trade name Surfadone® LP300, also from ISP and also known as N-dodecyl 2-pyrrolidone). Other examples are found in U.S. Pat. No. 7,264,885, incorporated by reference herein in relevant part with respect to such pyrrolidone-based compounds.

If ethoxylated alcohol compounds are provided in the above embodiments they are preferably chosen from a range of either ethylene oxide content and/or alkyl chain length. The alcohol component is preferably about 8 to about 18 carbon atoms in length, and the ethylene oxide content is preferably about 1 to about 50 mole percent. Selections such as a one mole percent ethylene oxide having an alcohol chain length of about 12 to about 13 carbons may be used (such material is commercially available from Air Products and Chemicals, Inc. under the trade name Tomadol® 23-1). Another example compound is a thirteen mole percent ethylene oxide having an alcohol chain length of about 14 to about 15 carbon atoms (available also from Air Products under the trade name Tomadol® 45-13). It should be noted that the one-molar example has a hydrophilic-lipophilic balance (HLB) of 3.7 and the 13 molar example has an HLB value of 14.4.

Additional wetting agents which may be used include acetylenic diols (examples of which are available under the trade name Surfynol® 104 from Air Products and Chemicals, Inc.). Such compounds are also powerful defoamers, and so should be used with the knowledge that defoaming agents can in some instances cause severe issues in the gypsum wallboard manufacturing process by coalescing the intentional air bubbles created in the wallboard to reduce weight. When these air bubbles are coalesced, they can form blisters on the surface of the wallboard during manufacture or even cause the paper or other scrim to de-bond from the gypsum core.

The organic zirconium or organic titanium compounds which may be used either alone or with the above-noted wetting agents and/or surfactants as the second additives in the above-embodiments may be one of the following: The organic zirconium or organic titanium compound additive in the above-embodiments may be one of the following:

titanium IV 2,2(bis-2-propenolatomethyl) butanolato, tris-neodecanato-O;

titanium IV 2,2(bis-2-propenolatomethyl) butanolato, tris(dodecyl)benezenesulfanato-O; titanium IV 2,2(bis-2-propenolatomethyl) butanolato, tris(dioctyl)pyrophosphate-O;

titanium IV 2-propenolatomethyl, tris-isooctadecanoato-O; sodium zirconium lactate;

triethanolamine titanium complex;

titanium phosphate complex;

alkanolamine titanate; and titanium chelate or combinations thereof.

The additive in a further embodiment has the chemical formula:

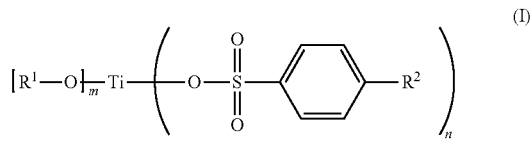

wherein $R^1$ may be a straight or branched chain, substituted or unsubstituted, alkyl, alkenyl, aralkyl, aralkenyl group of from about 5 to about 30 carbon atoms, wherein the group has from zero to or about 10 oxygen atoms; $R^2$ may be the same or different than $R^1$; and m and n are integers and each is at least 1 and no greater than 4. In yet a further preferred embodiment, $R^1$ is a branched chain alkenyloxy group of about 5 to about 12 carbon atoms and $R^2$ is different from $R^1$ and is a straight chain alkyl group of about 10 to about 15 carbon atoms; and m is 1 and n is 3. In a still further preferred embodiment, the additive has the chemical formula:

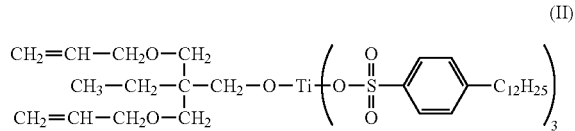

The first additive may be a blend of additives having the characteristics as noted above. The second additive may also be a combination of surfactants and/or wetting agents and/or organic titanium and/or organic zirconium compounds. As with the dispersant, the first and second additives may be provided directly to the slurry as noted herein, or provided to the slurry by way of first combining such additive components in the wax emulsions herein.

Thus, the strength additive and optional dispersant and/or wetting agents and/or surfactants noted above may optionally be provided to the composition by incorporating the additive into the wax emulsion prior to incorporating the wax emulsion into the gypsum slurry, or incorporating some of the components in the slurry and some into the slurry through the wax emulsion.

In one further embodiment using the wax emulsion of the present invention to provide to the settable gypsum composition herein, the composition may include about 35 percent by weight to about 80 percent by weight of the water, preferably about 50 percent by weight to about 65 percent by weight of the water; and the wax emulsion as noted herein in amounts of about 0.1 to about 20 weight percent of the slurry. The composition may also then include about 0.001 percent by weight to about 10 percent by weight of the optional first additive, preferably about 0.01 percent by weight to about 2 percent by weight of the first additive; and about 0.001 percent by weight to about 10 percent by weight of the optional second additive, and preferably about 0.01 percent by weight to about 2 percent by weight of the first additive. Other optional ingredients, preferably in amounts as noted herein (but variation for properties may occur depending on the ultimate composition), may be provided also the settable gypsum composition herein.

The settable gypsum formulations herein including the emulsion described above, with or without the optional first and second additives and any other optional additives noted hereinabove are described below. In preparing a gypsum wallboard using the components herein, an aqueous slurry of the gypsum material is prepared in any suitable manner known in the art or to be developed. In an embodiment of the invention, an aqueous emulsion, the individual components and any additives in the emulsion according to the invention are then added to the slurry and mixed with the slurry in proportions to provide about 0.5 part to about 20 parts by weight of solids per 100 parts of gypsum. Alternatively, a gypsum slurry may be formed and the strength and rheological enhancing first and second additives and/or optional dispersants, wetting agents and/or surfactants and any other desired components are provided directly to the gypsum slurry without first being mixed with other components.

The base gypsum compositions may be varied in accordance with conventional gypsum formulation requirements in the art of gypsum manufacture. Other ingredients such as foaming agents, other dispersants and set accelerators may be included in the slurry. In addition, it is noted that in preferred embodiments of settable gypsum slurry formulations using emulsions with the optional first and second additives noted above, a ratio of about 0.001:100 to about 10.0:100, more preferably about 0.01:100 to about 2.0:100, and most preferred about 0.1:100 to about 1.0:100, preferably exists between the strength additive(s) and the gypsum in the slurry. While this is not required, it contributes to achieving beneficial strength properties if desired.

In preparing wallboard from such a settable gypsum formulation, the mixture of gypsum slurry and the emulsion in various embodiments of the invention can be applied to a first sheet of wallboard liner to form a layer of the gypsum mixture thereon. A second sheet of liner may then be disposed on top of the deposited layer to form a wallboard assembly or structure in which the first and second sheets are in opposed, facing relationship and have the layer of the gypsum mixture therebetween. Alternatively, the gypsum slurry may be prepared directly into a liner-less wallboard structure using manufacturing methods involving press-in-place molding and similar techniques, such that reference to gypsum wallboard herein, is not restricted to liner-covered wallboard. However, it should be understood that any manufacturing technique for making wallboard including a settable gypsum formulation is within the scope of the invention described herein, such as for example, wallboard manufactured with glass mats on the exterior surfaces instead of standard liners.

The resulting structure or assembly may then be dried, such as by oven drying to remove excess water not needed for hydration of the gypsum, to leave finished gypsum wallboard. If liners are used, they may be formed of paper or may comprise fiberglass or organic fiber mats as well. Use of the compositions of the invention and/or providing the optional first and second additives and dispersants to the slurry to help to reduce drying time and/or heat, are included herein and may thereby contribute also to energy savings in the manufacture of such gypsum wallboards as well as enhancing strength. In forming water-resistant gypsum wallboard, the aqueous wax emulsions herein may be used so as to provide a lower-solids alternative to traditional water-resistant wax emulsions while maintaining slurry, rheological and water-resistant properties. This method is also an improvement when using wax-based formulations herein in water-resistant gypsum wallboard.

component was added. The Control and Comparative Control Samples are compared to four inventive examples, A, B, C, and D. In the samples, the various hydrocarbon component used are identified. The type of gypsum used was a standard wallboard manufactured according to ASTM C1936 meeting Application Standards ASTM C830 and GA216. The starch used was a commercial starch, Wallboard Binder, Industrial Starch-Modified from Tate & Lyle. The soap used in the slurry was an additional surfactant (soap), Cedepal® FA-406, available from Stepan in a 5% blend in water. The results are in Table 1 below.

TABLE 1

| Component | Control | Comparative Control | A | B | C | D |
|---|---|---|---|---|---|---|
| Hydrocarbon Component (Norsolene® M1090) | — | — | 3.00 | 5.00 | 7.00 | 7.00 |
| Paraffinic hydrocarbon (Paraffin Wax) | 33.98 | 23.98 | 20.98 | 18.98 | 16.98 | 17.23 |
| Montan Component (Romonta N) | 3.00 | 3.00 | 3.00 | 3.00 | 3.00 | 3.00 |
| Stabilizer (PVA) | 2.00 | 2.00 | 2.00 | 2.00 | 2.00 | 2.00 |
| Dispersant (lignosulfonate) | 0.42 | 0.42 | 0.42 | 0.42 | 0.42 | 0.20 |
| Saponifying Agent (potassium hydroxide) | 0.53 | 0.53 | 0.53 | 0.53 | 0.53 | 0.50 |
| Water | 60.07 | 70.07 | 70.07 | 70.07 | 70.07 | 70.07 |
| Total | 100.00 | 100.00 | 100.00 | 100.00 | 100.00 | 100.00 |
| Emulsion Viscosity (cPs) | 200 max | 43 | 53 | 53 | 45 | 52 |
| Absorption (24 hours) (%) | 1.80 | 3.21 | 2.26 | 2.05 | 1.74 | 1.83 |
| Emulsion Stability | Excellent | Excellent | Excellent | Excellent | Excellent | Excellent |
| Solids content | 38-42 | 31.43 | 28.63 | 29.21 | 30.53 | 30.17 |
| Color | Brown | Brown | Brown | Brown | Brown | Brown |

The invention will now be described with respect to the following non-limiting examples:

EXAMPLE 1

In this example, emulsions formed according to the invention were formed along with lab-sized gypsum boards using such emulsions for testing. All liquids were added such as water, the wax emulsion was provided along with any other additives to a Waring® industrial kitchen blender. Stucco was then mixed with starch and accelerator (BMA—ball mill accelerator). The stucco was allowed to soak in the liquids for about 10 seconds then the blender was turned to medium speed for about 15 seconds. The resulting slurries were poured into a form with paper to form a 12"×12" initial set. At two times the Vicat set, a portion was taken from the middle of the boards in a 6"×6" sample and which were moved to an oven set at 176° C. After 18 minutes, the boards were flipped and dried for an additional 18 minutes. Following which, the boards were dried at 43° C. for 24 hours. After cooling to room temperature, the boards were cut and tested.

Water absorption of the 6"×6" board was measured. A control sample was tested based on commercial emulsion, Aqualite® 70 to evaluate performance based on emulsion viscosity (cPs), water absorption as noted above (ABS %) at 24 hours, emulsion stability, solids content, pH and color. A comparative control was also prepared in which less paraffin wax was used, but more water included, but no hydrocarbon It will be appreciated by those skilled in the art that changes could be made to embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. An aqueous wax emulsion for use in a gypsum formulation, comprising:
   water;
   a paraffinic hydrocarbon;
   montan wax component; and
   a hydrocarbon component which is at least one hydrocarbon compound having from 5 to 20 carbon atoms or at least one hydrocarbon resin which is based on the at least one hydrocarbon compound as a monomer, wherein the resin is at least a dimer comprising the hydrocarbon compound and the resin has a molecular weight (Mw) of no greater than about 3,000, wherein the hydrocarbon compound is saturated or unsaturated, functionalized or nonfunctionalized and is aliphatic, alicyclic, or aromatic,
   wherein the hydrocarbon component has a softening point of from about 22° C. to about 110° C.;
   wherein the water comprises about 60 parts to about 80 weight percent of the emulsion;

the montan wax component is about 1 part to about 200 parts by weight per 100 parts of the combined weight of the hydrocarbon component and the paraffinic hydrocarbon; and a ratio of the hydrocarbon component to the paraffinic hydrocarbon is from about 0.004:1 to about 2:1.

2. The aqueous wax emulsion according to claim 1, wherein the softening point of the hydrocarbon component is from about 65° C. to about 110° C.

3. The aqueous wax emulsion according to claim 1, wherein the water comprises at least about 70 weight percent of the emulsion; the montan wax component preferably about 1 part to about 50 parts by weight per 100 parts by weight of the combined weight of the hydrocarbon component and the paraffinic hydrocarbon; and the ratio of the hydrocarbon component to the paraffinic hydrocarbon is from about 0.02:1 to about 1:1.

4. The aqueous wax emulsion according to claim 3, wherein the ratio of the hydrocarbon component to the paraffinic hydrocarbon is about 0.05 to about 0.4:1.

5. The aqueous wax emulsion according to claim 1, wherein the montan wax component consists essentially of montan wax.

6. The aqueous wax emulsion according to claim 1, wherein the montan wax component comprises montan wax and a montan wax substitute.

7. The aqueous wax emulsion according to claim 6, wherein the montan wax substitute is selected from the group consisting of a synthetic normal α-olefin wax, a synthetic olefin wax of a carbon chain length of about 20 or more carbon atoms that is modified by oxidizing and/or refining through distillation or stripping, natural or synthetic carnauba wax, palm wax, Fischer-Tropsch wax, polymeric alkenes, oxidized polyethylene waxes, and mixtures and blends thereof.

8. The aqueous wax emulsion according to claim 1, wherein the hydrocarbon component is selected from the group consisting of
   (i) an aromatic petroleum hydrocarbon resin formed by aromatic petroleum distillate products and having a molecular weight of about 1,000 or less and a softening point of about 90° C. to about 100° C. and phenol-functionalized resins, acid-functionalized resins, and esters thereof;
   (ii) an aromatic hydrocarbon compound or resin taken from a petroleum distillate fraction of C5 to C9 components, having a softening point of about 75° C. to about 105° C. and phenol-modified compounds and resins, acid-modified compounds and resins, and esters thereof;
   (iii) terpene resins and terpene phenolic resins;
   (iv) rosin, rosin esters, pentaerthyritol-containing rosins, pentaerythritol-containing rosin esters, and acid-modified rosins;
   (v) acid-modified resins, pentaerythritol-containing resin esters;
   (vi) aliphatic and alicyclic hydrocarbon resins of softening points from about 95° C. to about 105° C.;
   (vii) coumarone-indene resins having a softening point of about 20° C. to about 100° C.;
   (viii) alkyl-, alkenyl-, alkynl-, or aryl-functionalized naphthalene esters; and
   (ix) alicyclic compounds selected from the group of phenols, terpenes, indenes, naphthas, naphthalenes and alkyl-, alkenyl-, alkynl-, aryl-functionalized compounds thereof.

9. The aqueous wax emulsion according to claim 1, wherein the paraffinic hydrocarbon is a wax having a melting point of about 40° C. to about 80° C.

10. The aqueous wax emulsion according to claim 1, further comprising about 1 to about 50 part by weight of a stabilizer per 100 parts by weight of the weight of the paraffinic hydrocarbon and the hydrocarbon component.

11. The aqueous wax emulsion according to claim 10, wherein the stabilizer is a polyvinyl alcohol which is at least 90% hydrolyzed.

12. The aqueous wax emulsion according to claim 11, wherein the polyvinyl alcohol is about 97% to 100% hydrolyzed.

13. The aqueous wax emulsion according to claim 1, further comprising about 1 to about 5 percent by weight of the emulsion of an emulsifier.

14. The aqueous wax emulsion according to claim 13, wherein the emulsifier is a nonionic surfactant and/or an anionic surfactant.

15. The aqueous wax emulsion according to claim 1, further comprising about 0.01 weight percent to about 5 weight percent of the emulsion of a saponifying agent.

16. The aqueous wax emulsion according to claim 15, wherein the saponifying agent contains an alkali metal.

17. The aqueous wax emulsion according to claim 1, further comprising 0.01 weight percent to about 2 weight percent of the emulsion of a dispersant and/or a surfactant having a sulfur-containing group.

18. The aqueous wax emulsion according to claim 17, wherein the dispersant and/or surfactant is lignosulfonic acid, naphthalene sulfonic acid, sulfonate salt of lignosulfonic acid, or sulfonate salt of naphthalene sulfonic acid.

19. An aqueous wax emulsion comprising:
   (a) at least about 70 weight percent water;
   (b) about 15 weight percent to about 18 weight percent paraffinic hydrocarbon wax having a melting point of about 40° C. to about 80° C.;
   (c) about 0.1 to about 1 weight percent of an alkali metal;
   (d) about 2 to about 5 weight percent montan wax and/or a montan wax substitute;
   (e) about 0.1 weight percent to about 10 weight percent of polyvinyl alcohol which is at least 97% hydrolyzed; and
   (f) about 0.1 weight percent to about 10 weight percent of a hydrocarbon component which is at least one hydrocarbon compound having from 5 to 20 carbon atoms or at least one hydrocarbon resin which is based on the at least one hydrocarbon compound as a monomer, wherein the resin is at least a dimer comprising the hydrocarbon compound and the resin has a molecular weight (Mw) of no greater than about 3,000, wherein the hydrocarbon compound is saturated or unsaturated, functionalized or nonfunctionalized and is aliphatic, alicyclic, or aromatic,
   wherein the hydrocarbon component has a softening point of from about 22° C. to about 110° C.

20. The aqueous wax emulsion according to claim 19, wherein the hydrocarbon component is selected from the group consisting of
   (i) an aromatic petroleum hydrocarbon resin formed by aromatic petroleum distillate products and having a molecular weight of about 1,000 or less and a softening point of about 90° C. to about 100° C. and phenol-functionalized resins, acid-functionalized resins, and esters thereof;
   (ii) an aromatic hydrocarbon compound or resin taken from a petroleum distillate fraction of C5 to C9 components, having a softening point of about 75° C. to about 105° C. and phenol-modified compounds and resins, acid-modified compounds and resins, and esters thereof;
(iii) terpene resins and terpene phenolic resins;
(iv) rosin, rosin esters, pentaerthyritol-containing rosins, pentaerythritol-containing rosin esters, and acid-modified rosins;
(v) acid-modified resins, pentaerythritol-containing resin esters;
(vi) aliphatic and alicyclic hydrocarbon resins of softening points from about 95° C. to about 105° C.;
(vii) coumarone-indene resins having a softening point of about 20° C. to about 100° C.;
(viii) alkyl-, alkenyl-, alkynl-, or aryl-functionalized naphthalene esters; and
(ix) alicyclic compounds selected from the group of phenols, terpenes, indenes, naphthas, naphtalenes and alkyl-, alkenyl, alkynl-, aryl-functionalized compounds thereof.

* * * * *